United States Patent [19]

Szuba et al.

[11] Patent Number: 6,062,778
[45] Date of Patent: *May 16, 2000

[54] PRECISION POSITIONER FOR A CUTTING TOOL INSERT

[75] Inventors: Philip S. Szuba, Clinton Township; Byung-Kwon Min, Ann Arbor; George O'Neal, Ann Arbor; Zbigniew Jan Pasek, Ann Arbor; Yoram Koren, Ann Arbor, all of Mich.

[73] Assignee: Unova IP Corp., Woodland Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/130,873

[22] Filed: Aug. 7, 1998

Related U.S. Application Data

[60] Provisional application No. 60/055,889, Aug. 15, 1997.

[51] Int. Cl.$^7$ ...................................................... B23B 39/00
[52] U.S. Cl. ............................... 408/156; 82/1.5; 408/13; 408/147
[58] Field of Search ............................ 409/231; 408/147, 408/156, 153, 154, 13, 180; 82/1.4, 1.5

[56] References Cited

U.S. PATENT DOCUMENTS

| | | | |
|---|---|---|---|
| 4,509,236 | 4/1985 | Morita et al. | 408/180 |
| 4,605,346 | 8/1986 | Trevarrow | 408/147 |
| 4,933,868 | 6/1990 | McMurtry | 408/156 |
| 4,941,782 | 7/1990 | Cook | 408/147 |
| 5,304,019 | 4/1994 | Klee et al. | 408/156 |
| 5,393,177 | 2/1995 | Cook et al. | 408/147 |
| 5,651,645 | 7/1997 | Wawrzyniak et al. | 408/13 |

FOREIGN PATENT DOCUMENTS 63-185505  8/1988  Japan .

OTHER PUBLICATIONS

Jeong–Du Kim and Soo–Ryong Nam, Development of A Micron Dept Control System For An Ultra–Precision Lathe Using A Piezo–Electric Actuator.

Reed D. Hanson, Tsu–Chin Tsao, Reducing Cutting Force Induced Bore Cylindricity Errors By learning Control and Variable Depth of Cut Machining.

Guangming Zhang, Wing Fu Ko, Huhyn Luu, and X.J. Wang Design of a Smart Tool Post for Precision Machining.

Nejat Olgac, Brian Holm–Hansen, A New Method For Active Vibration Absorption In Boring.

E. Kouno, A Fast Piezoelectric Actuator for Servo Correction of Systematic Errors in Precision Machining.

Michael A. Marra, Bruce L. Walcott, Keith E. Rouch, Sanjiv G. Tewani, H. Vibration Control For Machining Using Active Absorber Technology.

V. Okazaki, A Micro–positioning tool post using a piezoelectric actuator for diamond turning machines.

Reed D. Hanson, Tsu–Chin Tsao, Compensation For Cutting Force Induced Bore Cylindricity Dynamic Errors –A Hybrid Repetitive Servo/Iterative Learning Process Feedback Control Approach.

Reed D. Hanson, Tsu–Chin Tsao Development of a Fast Tool Servo For Variable–Depth–of–Cut Machining.

A. Katsuki, H. Onikura, T. Sajima, T. Akashi, Development of a Deep–Hole Boring Tool Guided by Laser.

K. Kim, K. F. Enman, S.M. Wu, In–Process Control of Cylindricity in Boring Operations.

Johne F DK Patent No. DK 3926025 Abstract only.

*Primary Examiner*—Daniel W. Howell
*Attorney, Agent, or Firm*—Brian L. Ribando

[57] ABSTRACT

A cutting tool insert is mounted on a flexure member that is mounted on the end of a boring bar. The construction of the flexure member is such that it is compliant along a radial axis perpendicular to the direction of tool advancement, but relatively stiff along a feed axis in the direction of tool feed, and along a cutting axis in the direction of tool rotation. Any displacement of the flexure member and cutting tool insert as a result of workpiece engagement or boring bar deflection is sensed by laser detectors. Signals from the laser detectors are coupled to a computer that rotates with the boring bar and are used to provide feedback signals to an actuator in contact with the flexure member. The actuator displaces the flexure member to correct the position of the tool insert.

22 Claims, 3 Drawing Sheets

PRECISION POSITIONER FOR A CUTTING TOOL INSERT

This application claims the benefit of U. S. Provisional Application No. 60/055889, filed Aug. 15, 1997.

This invention is made with United States Government Support under Cooperative Agreement No. 70NANB5H1158 awarded by NIST. The United States Government has certain rights in this invention.

The invention relates to a rotary tool in which sensors monitor displacement of a cutting tool insert in the tool due to workpiece engagement or tool droop, and an actuation mechanism dynamically corrects the position of the cutting tool insert as the tool rotates.

BACKGROUND OF THE INVENTION

The process of machining a series of spaced concentric bores with the same diameter where the distance between adjacent bores is not too large (less than 1–5 bore diameters) is called line boring. Line boring requires use of dedicated manufacturing equipment and is a very demanding application in terms of both quality and production rate requirements.

In typical automotive applications the range of machined bore diameters is 25–75 millimeters (1–3 inches); the required cylindricity of the bore is 10–25 microns, and the surface finish $R_a$ is 2–50 microns. In extreme cases line boring bars can be as long as 1350 millimeters (53 inches) and weight up to 120 kg (250 lb).

Boring tools are recognized as a major bottleneck in increasing the flexibility and precision of the line boring processes. One of the major obstacles to increasing flexibility of the boring tool is that current tooling designs require outboard and intermediate support bushings. If these bushings are eliminated, automated tool change can be accomplished more readily, and system reliability is increased through simplified design and the elimination of bearing support components that wear. However, elimination of supports makes the boring bar more compliant thus leading to increased vibration and decreased precision. In a typical line boring station, the spindle is mounted horizontally, and a single dedicated boring bar which is responsible for machining the bore through the entire length of the engine casting is mounted on the spindle. Due to the length of the bore, the boring bar is usually supported by bushings at a number of points to ensure high precision of the operation. To facilitate entry and exit of the boring bar into the bore, the fixture is provided with a raising and lowering motion. The boring operation is performed sequentially, under control of a hard-wired system.

According to the prior art, line boring bars were supported at both ends to obtain adequate rigidity. As a result, all the journals could be machined simultaneously by including multiple cutting inserts down the length of the boring bar. The next evolution was a boring bar with longitudinal carbide guide pads that are ground to a diameter slightly smaller than the desired final bore diameter. In this process, a single-point dedicated tool bores the first hole, and is subsequently fed into the part until all journals are completed. The need for the outboard support is eliminated by using the part itself to support the tool with the guide pads as subsequent journals are machined. Because the length of the boring tool projecting from the spindle is constant (the part or the spindle itself moves), the deflections of the boring bar are also expected to be constant and the holes will be in precise alignment (assuming adequate rigidity of the part and fixturing). This is shown in FIG. 1.

The newest line boring development being used in manufacturing today is shown in FIG. 2 and is an extension of the guide pad concept. This method moves the tool in the feed direction relative to the spindle.

Mapal Inc. has developed fineboring bars that feature an adjustable, indexable blade on each tool and at least two guide pads on the periphery of the tool to support the tool immediately after a cut. Such a design increases the stiffness and the first natural frequency of the bar which leads to improved boring precision. A Danish patent by Johne, DK 3,926,025 [1991] shows a machine tool precision boring head which uses flexible parallel springs to serve as an end support. A Japanese patent by Tajima, JP 63185505A [1988] enhances productivity and machining accuracy by automatically exchanging a line boring bar and support bushings and by automatically adjusting the position of supports, the boring bar and a workpiece with the use of an NC machine tool.

It is accordingly an object of the invention to provide a rotary tool with a means for adjusting the position of the cutting tool insert while the tool is rotating.

It is another object of the invention to provide a rotary tool with a means for detecting displacement of the tool from its intended position.

It is another object of the invention to provide a rotary tool with a cutting tool insert in which an electromechanical actuator is used to adjust the position of the insert relative to the tool.

It is another object of the invention to provide a rotary boring tool in which the position of a cutting tool insert is compensated for unintended displacement due to workpiece engagement or boring tool droop.

It is another object of the invention to develop signals used to correct the position of a cutting tool insert in a rotating tool by means of a computer and other electronics that rotate with the tool.

DESCRIPTION OF THE PRIOR ART

Figure 1:
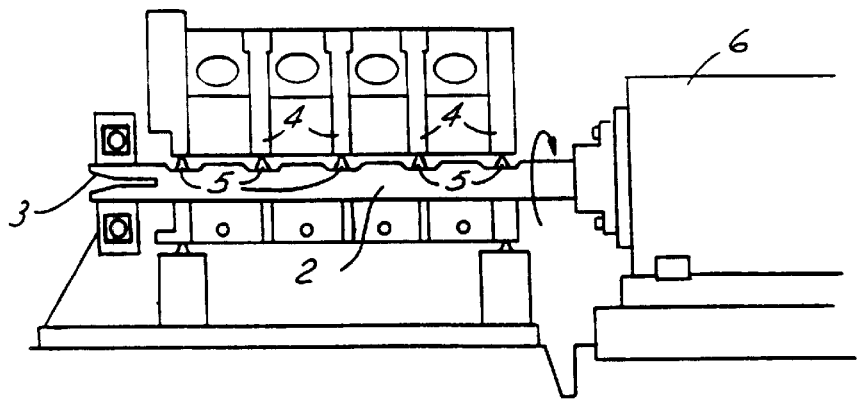
FIG. 1 shows a prior art apparatus for performing line boring.

FIG. 1 shows a prior art boring bar 2 which is supported at the end 3 remote from the spindle 6 to ensure rigidity. Using this construction, all of the journals 4 can be machined simultaneously by including multiple cutting inserts 5 that are positioned along the length of the bar.

Figure 2:
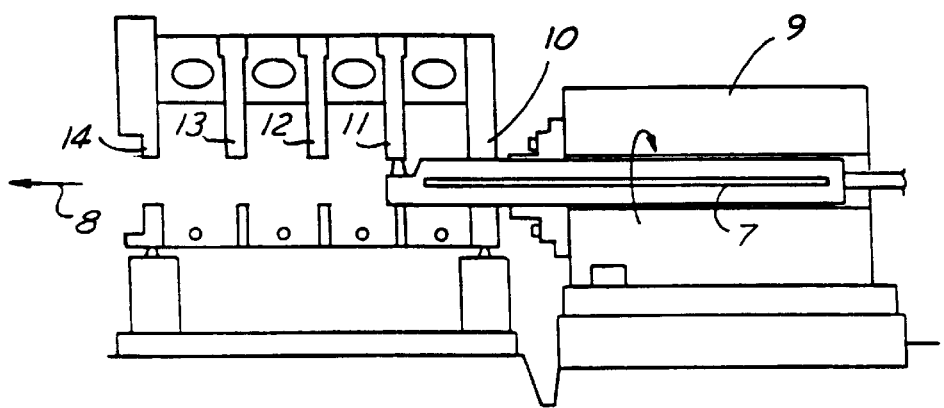
FIG. 2 shows another prior art apparatus for performing line boring.

FIG. 2 shows another prior art boring bar 7 in which the bar 7 is advanced in the feed direction 8 relative to the spindle 9. Using this method, the spindle 9 can be brought very close to the first journal 10 of the part, eliminating the need for inboard support.

Subsequent journals 11–14 are machined by advancing the tool relative to the spindle. This technique minimizes tool deflection by minimizing tool overhang and maximizing tool support.

Figure 3:
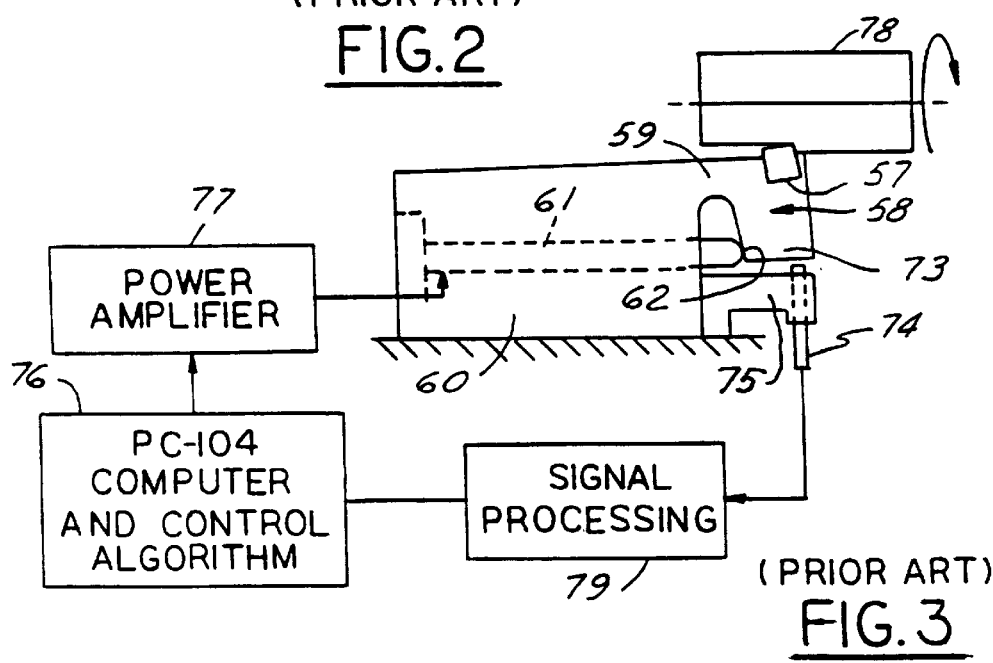
FIG. 3 shows a prior art tool tip translation mechanism.

FIG. 3 shows a prior art tool tip translation mechanism for a turning process in which a non-rotating cutting insert 57 engages a rotating workpiece 78. The cutting insert 57 is mounted in a tool holder 58 which is connected by a flexure hinge 59 to a stationary mount 60. A piezoelectric actuator 61 positioned in the stationary mount 60 has an active end 62 in contact with a lower end 73 of the tool holder 58. A capacitive sensor 74 is held by a sensor mount 75 so that one end of the sensor 74 is positioned in close proximity to the lower end 73 of the tool holder 58. The capacitive sensor is coupled to a signal processor 79, the output of which is coupled to a PC-104 computer and control algorithm 76. The output of the PC-104 computer and control algorithm 76 is coupled to a power amplifier 77, the output of which is coupled to the piezoelectric actuator 61.

The purpose of tool tip controller of FIG. 3 is to control the position of the cutting tool 57 as the workpiece 78 is rotated relative to it, thus enabling an elliptical, or other non-circular profile, to be cut. The capacitance type gap sensor 74 develops a position feedback signal to provide the controller 76 with the displacement information for the tool tip relative to a reference. The PC-104 computer and control algorithm 76 is designed to track a reference signal, and to apply appropriate signals to the power amplifier 77 to correct the position of the cutting insert 57. The power amplifier energizes the piezoelectric actuator 61 to displace the cutting insert 57 as required to produce the desired profile cut in the workpiece 78.

DESCRIPTION OF THE PREFERRED EMBODIMENT

Figure 4:
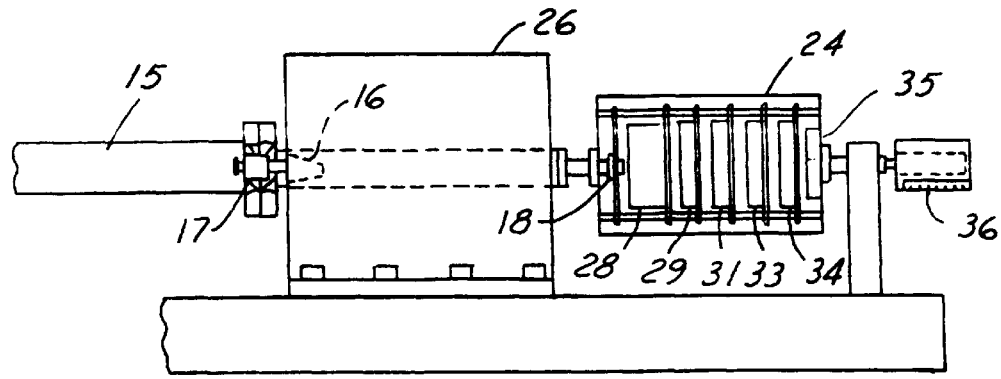
FIG. 4 shows an overall system layout of the invention.

A boring tool according to the instant invention is generally shown in FIG. 4. A boring bar 15 is mounted on a motorized, high-precision spindle 26 (7.5 HP, max rotational speed 6,000 rpm) and is connected to the spindle through a standard taper mechanism 16 enhanced with additional electrical connectors 17, 18. The connectors 17 and 18 provide signal and power connections between the elements in the boring bar 15 and the electronics in an instrumentation housing 24 as more fully explained below. The necessary instrumentation for an actuator 23 and for sensors 21 and 22 is located in the instrumentation housing 24 attached to the rear end of the spindle 26 and rotates with it. The instrumentation housing 24 contains an on-board computer 28, laser electronics 29, position sensor electronics 31, a wireless transmitter 33 with an antenna for communication with the main controller of the machine, and power electronics 34 for a piezoelectric amplifier 35. Electrical power necessary to run the piezoelectric amplifier (125 V, 2 amps) may be transferred to the rotating housing 24 inductively, or via a set of slip rings 36 located behind the instrumentation housing 24, as shown. The instrumentation housing 24 is designed in such a way that it can work with other boring bars or other tools having dynamic tool tip compensation, thus eliminating the need to change the instrumentation housing when changing the boring bar 15.

Figure 5:
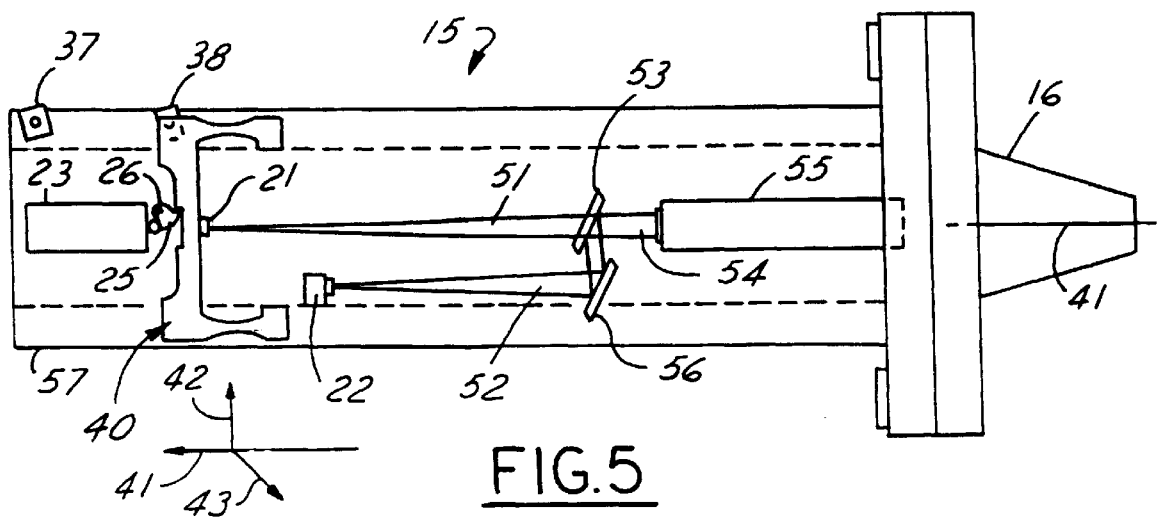
FIG. 5 shows the tool body of the invention.

The arrangement of elements in the interior of the boring bar 15 is generally shown in FIG. 5. Functionally, the bar contains three subsystems: a position detector including a laser diode 55 and two sensors 21 and 22, an actuator 23 coupled to a flexure mechanism 40, and cutting inserts 37 and 38. The cutting insert 38 is a finish cutter and is mounted on the flexure mechanism 40 while the cutting insert 37 is a rough cutter and is mounted in a traditional fixed position on the end of the boring bar 15.

The actuator 23 has to have a high cut-off frequency to compensate for the vibrations in the boring bar. The actuator also has to generate forces sufficient to accelerate the flexure mechanism 40. The actuator 23 must be compact enough to fit inside the boring bar 15, and light enough not to unduly affect the vibration resistance of the boring bar. Four types of actuators were considered for this application: solenoids, electric motors, magnetostrictive material, and piezoelectric material. Of these, an actuator comprising a stacked array of piezoelectric crystals, such as Model PZT5H-10×30 manufactured by Morgan Matroc, was determined to give the best results. Piezoelectric actuators have high operating frequencies, and high output energy per unit volume and mass. However, they have the disadvantage of small strokes, often requiring mechanical amplification.

In order to provide a feedback signal to a piezo-actuator control loop for tool tip adjustment, a laser measurement system is used. A first position sensitive laser detector 21 10 senses displacement of the cutting insert 38, and a second laser detector 22 senses displacement of the end of the boring bar 15. The first detector 21 which measures the position of the cutting tool is a single axis bi-cell detector such as a Model SPOT-2D manufactured by UDT Sensors. Such a detector has been chosen because the cutting tool motion is constrained to the thrust direction along the axis 42 and the information for the piezoelectric actuator is required only for the same degree of freedom. Small motion in the feed direction 41 or along the cutting axis 43 has negligible effect on the accuracy of the cut. The detector 22 which measures the displacement of the end of the boring bar is a two-dimensional continuous position sensitive detector such as a Model SC AD manufactured by UDT Sensors. The detector 22 provides supplemental information about the motion of the end 57 of the bar body.

The sensitivity of the position measurement is limited by noise of the electronic components, especially the amplifier 35. Under ideal conditions in a screen room environment and using a filter to reduce the noise level, a resolution of about 0.1 microns has been achieved.

The use of position sensitive laser detectors 21 and 22 is based on the assumption that the vibration of the end of the boring bar 15 held in the precision spindle is negligible. Any motion observed by the detector 21 is therefore due solely to motion of the cutting insert 38 either caused by the actuator 23 or as a reaction to the workpiece. Any motion observed by the detector 22 is due to motion of the cutting end of the boring bar 15, for example, boring bar droop. If repeatable errors are produced by the spindle motion (spindle error motion), these can be mapped and corrected.

Two optical beams 51, 52 are produced by splitting the beam 54 from the laser diode using a beam splitter 53. The laser diode 55 and the focusing optics are located on the axis of rotation 41. A first beam 51 passes on-axis to the detector 21 attached to the flexure mechanism 40. The second beam 52 is directed by the beam splitter 53 and the mirror 56 to the off-axis detector 22 attached to the end of the boring bar 15.

In general, the flexure mechanism should enable actuation of the cutting tool or insert 38 along the thrust axis 42, while simultaneously rejecting forces along the feed axis 41 and the cutting axis 43. As a result, only thrust forces are transmitted to the actuator. In the ideal case, the flexure mechanism 40 should constrain the cutting insert exclusively to rectilinear motion in the direction of the thrust axis 42. Parasitic motion along the feed axis 41 affects the feedrate, which in turn may increase surface roughness and is thus minimized by the design of the flexure mechanism 40. The flexure mechanism 40 should also be designed to provide the preload to the piezoelectric material, thus the connection to the piezoelectric actuator only needs to transfer compressive loads, allowing the junction between the flexure mechanism 40 and the actuator 23 to be a simple point contact. Since the piezoelectric material is brittle, it needs to be isolated from shearing or tensile forces. Lastly, the flexure mechanism 40 should be dynamically balanced about the axis of spindle rotation 41 to reduce centripetal forces caused by rotation.

Figure 6:
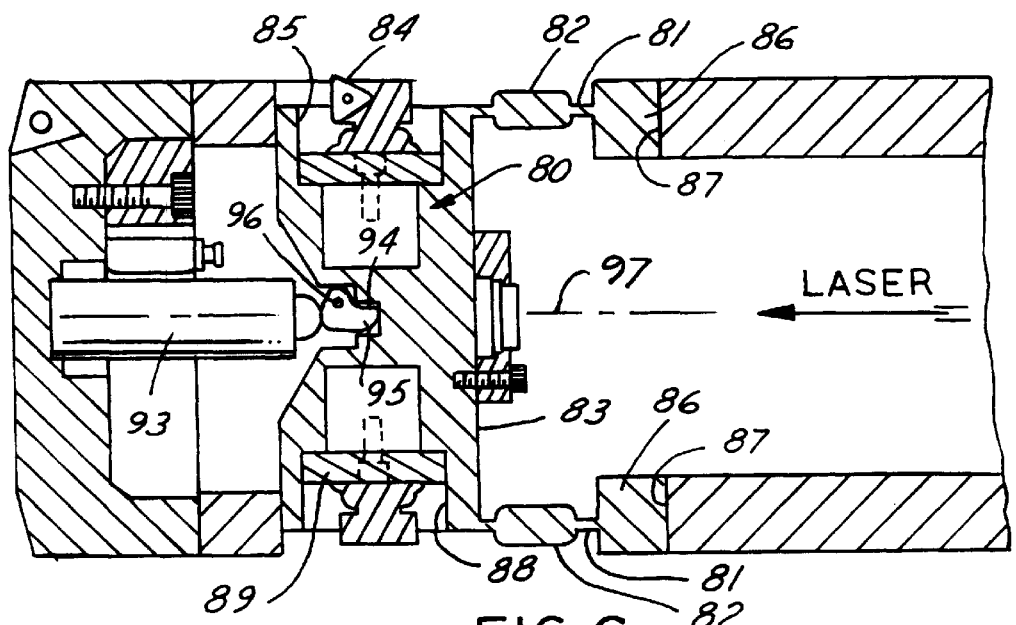
FIG. 6 shows a preferred form of tool tip translation mechanism.

One embodiment of the flexure mechanism is shown in FIG. 6. The mechanism 80 comprises two parallel spaced leaf springs 81 which are attached to a central base portion 83. Each leaf spring 81 includes a thick middle section 82, and the ends 86 of the springs remote from the base 83 are rigidly mounted to attachment points 87 on the boring bar 15. A finish cutting tool insert 84 is mounted in a recess 85 in the base 83. For dynamic symmetry, a similar recess 88 and a balancing weight 89 are provided on the other side of the base 83. The flexure mechanism is driven by a piezoelectric actuator 93 acting through a lever 95 mounted on a pivot 96. The lever 95 translates the axial force developed by the actuator 93 into a radial force and applies the force to a notch 94 formed in the back of the base 83 to move the tool 84 in the thrust direction 42 away from the tool axis 97. The lever 95 also magnifies the motion provided by the actuator 93.

Figure 7:
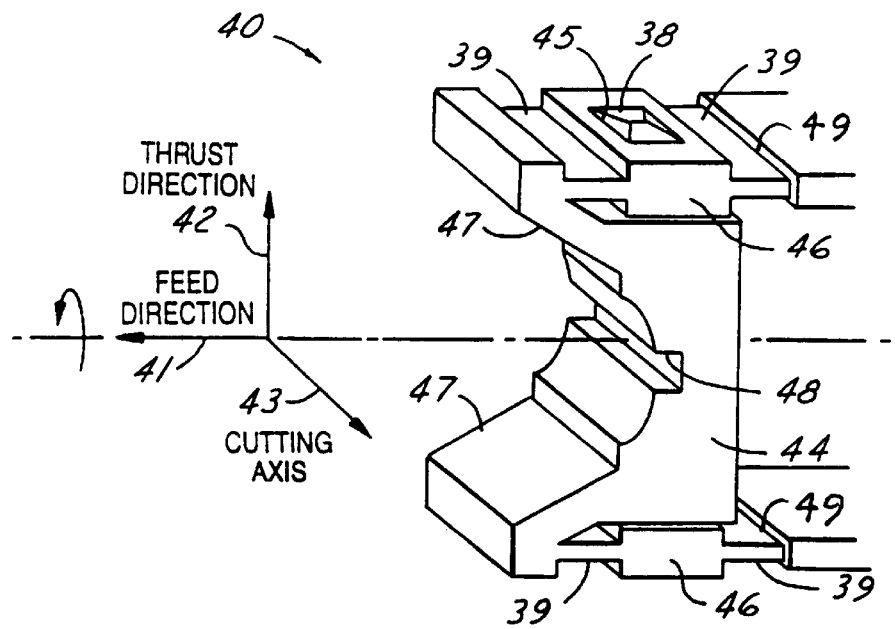
FIG. 7 shows an alternate form of tool tip translation mechanism.

A second embodiment of the flexure mechanism is shown in FIG. 7. The flexure mechanism 40 uses two parallel leaf springs 39 coupled to a pair of arms 47 extending from a base 44. The other end 49 of each leaf spring 39 is fastened to the boring bar 15. This design is symmetric about the spindle or feed axis 41 and is hence dynamically balanced. The symmetry of the two parallel leaf springs 39 reduces the tendency of the base to pitch, limiting the parasitic motion in the feed direction 41. A lever such as shown in FIGS. 5 and 6 engages the notch 48 and is used to convert and magnify the motion of the piezoelectric actuator 23 from the feed direction 41 to the thrust direction 42.

The base of the cutting tool 38 is mounted on the base portion 44 of the flexure member 40. This mounting location requires a through hole 45 in the middle of the thickest section 46 of the leaf spring through which the tool tip projects. For dynamic balance, symmetric holes are formed in both the upper and lower leaf springs 39. These holes 45 have limited effect on the stiffness in the cutting direction 43 or the feed direction 41 since most of the deformation occurs in the thinner sections of the spring 39 on either side of the thick section 46. Further, the moment of inertia associated with bending in the cutting direction 43 is least dependent on this central mass. Of course, any reduced stiffness along the tool thrust axis 42 is advantageous.

Figure 8:
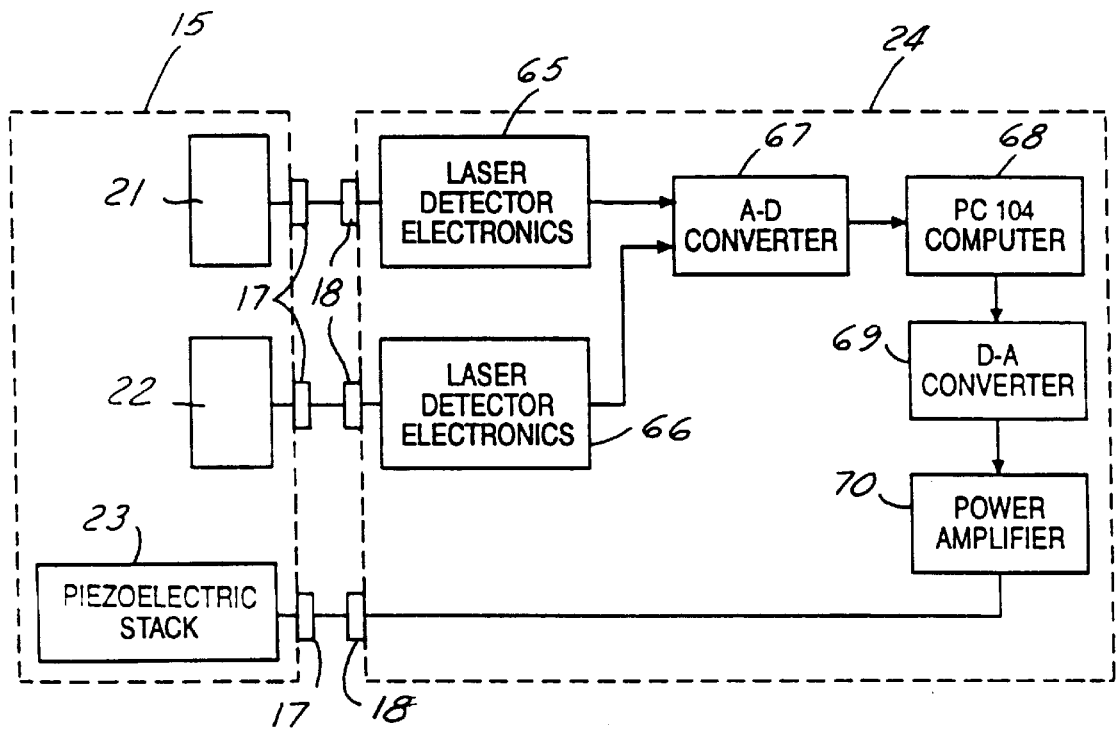
FIG. 8 is a block diagram showing the control arrangement for the tool tip actuator.

FIG. 8 shows in block diagram form the control arrangement for the tool tip actuator according to the invention. The signals developed by the laser detectors 21 and 22 in the boring bar 15 are coupled through the connectors 17 and 18 to the laser detector electronics 65 and 66 which are mounted in the instrumentation housing 24. The signals from the electronic packages 65 and 66 are coupled to an analog to digital converter 67 for application to a PC-104 computer 68. The PC-104 computer determines whether the tool tip or the end of the boring bar has deflected from its intended position. If deflection has taken place, an appropriate signal is applied to a digital to analog converter 69. The resulting output from the converter 69 is applied to a power amplifier 70, and the output from the amplifier 70 is coupled through the connectors 18 and 17 to the actuator 23. The actuator 23 lengthens as a result of the signal from the amplifier 70, and the change in length is coupled to the flexure mechanism to correct the position of the tool insert as described above. In experimental tests, it has been possible to control the position of the tool tip insert to within 0.1 micron of a desired position while the tool rotates at speeds of up to 3,000 rpm.

The PC-104 computer can operate at speeds of up to 7,000 hz, thus the response of the system is limited by the mass and design of the actuator and the flexure mechanism to 600–700 hz. At 1,000 rpm the device rotates 16.66 revolutions/sec, and a response of 600 hz provides 36 corrections/revolution, or 1 correction per 10 degrees of rotation. It will be apparent to those skilled in the art that slower rotational speeds will allow a greater number of corrections per revolution.

Having thus described the invention, various modifications and alterations will occur to those skilled in the art, which modification and alteration are intended to be within the scope of the invention as defined by the amended claims.

We claim:

1. A rotary tool having a movable cutting tool insert which compensates for undesired displacement of the rotary tool or the cutting tool insert comprising:

means for mounting the tool insert in the tool, means contained within the tool for sensing displacement of the tool insert relative to the tool, and, actuator means for adjusting the position of the tool insert relative to the tool.

2. The tool of claim 1 wherein the means contained within the tool for sensing displacement of the tool insert relative to the tool comprises a laser emitter and a first laser sensor.

3. The tool of claim 1 wherein the actuator means for adjusting the position of the tool insert comprises an electromechanical transducer.

4. The tool of claim 3 wherein the electromechanical transducer comprises a piezoelectric transducer.

5. The tool of claim 1 wherein the means for mounting the tool insert in the tool comprises a rigid block-like base and a pair of spring arms, wherein the pair of spring arms are attached to the rotary tool and resiliently support the block-like base.

6. The tool of claim 5 wherein the cutting tool insert is mounted on the block-like base.

7. The tool of claim 5 wherein the cutting tool insert is mounted on the block-like base and extends through an aperture formed in one of the spring arms.

8. The tool of claim 5 wherein the spring arms are compliant in the radial direction relative to the rotary tool and stiff in the axial direction and the cutting direction.

9. The tool of claim 5 wherein the electromechanical transducer displaces the block-like base in a radial direction, perpendicular to the axis of the rotary tool.

10. The tool of claim 9 wherein the electromechanical transducer produces a force along the axis of the tool, and a lever couples the axial force to the block-like base to produce a movement of the base in a direction which is perpendicular to the axis of the tool.

11. The tool of claim 10 wherein the means for sensing tool displacement comprises one laser emitter and two laser sensors.

12. The tool of claim 11 wherein a first of the two laser sensors is mounted on the axis of tool rotation and the second of the two laser sensors is mounted off the axis of tool rotation.

13. The tool of claim 12 wherein the first laser sensor is mounted on the block-like base and the second laser sensor is mounted on a portion of the rotary tool.

14. The tool of claim 5 wherein the block-like base and the spring arms are symmetric around the axis of rotation of the tool.

15. The tool of claim 2 wherein signals from the first laser sensor are coupled to laser electronics which are mounted to rotate with the tool.

16. The tool of claim 15 wherein signals from the laser electronics are coupled to a computer and a power amplifier which rotate with the tool, and signals from the power a amplifier are coupled to the actuator means for adjusting the position of the tool insert relative to the tool.

17. The tool of claim 16 wherein the rotary tool is attached to a spindle and the computer and power amplifier are contained in a housing which are attached the same spindle.

18. A boring bar having a cutting tool insert comprising:
  a movable mount for the cutting tool insert;
  a first sensor for detecting displacement of the mount relative to the sensor; and
  an actuator for adjusting the position of the mount in the tool.

19. The boring bar of claim 18 further comprising a laser emitter in the boring bar, wherein the first sensor is a laser detector.

20. The boring bar of claim 19 wherein the actuator is an electromechanical actuator which adjusts the position of the movable mount through a lever.

21. The boring bar of claim 19 wherein the mount has a pair of spring-like arms for attaching the movable mount to the boring bar.

22. The boring bar of claim 21 wherein the first sensor is mounted on the movable mount, and a second sensor is mounted on the boring bar, whereby the second sensor detects boring bar droop.

* * * * *